United States Patent [19]
Wechsler

[11] Patent Number: 6,092,184
[45] Date of Patent: *Jul. 18, 2000

[54] PARALLEL PROCESSING OF PIPELINED INSTRUCTIONS HAVING REGISTER DEPENDENCIES

[75] Inventor: Ofri Wechsler, Ramat Ishai, Israel

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/579,836

[22] Filed: Dec. 28, 1995

[51] Int. Cl.<sup>7</sup> ......................................................... G06F 9/00

[52] U.S. Cl. .......................................... 712/218; 712/215

[58] Field of Search ..................................... 395/391, 393, 395/394, 800.23, 377; 364/748.13; 712/215, 217, 218, 201, 23

[56] References Cited

U.S. PATENT DOCUMENTS

| | | | |
|---|---|---|---|
| 3,711,692 | 1/1973 | Batcher ................................... | 708/210 |
| 3,723,715 | 3/1973 | Chen et al. ............................. | 708/709 |
| 4,003,033 | 1/1977 | O'Keefe et al. ........................ | 710/107 |
| 4,042,972 | 8/1977 | Gruner et al. .......................... | 712/213 |
| 4,112,489 | 9/1978 | Wood ...................................... | 712/218 |
| 4,161,784 | 7/1979 | Cushing et al. ........................ | 708/513 |
| 4,382,279 | 5/1983 | Ugon ........................................ | 712/37 |
| 4,393,468 | 7/1983 | New ........................................ | 708/518 |
| 4,418,383 | 11/1983 | Doyle et al. ............................ | 710/127 |
| 4,498,177 | 2/1985 | Larson ..................................... | 714/806 |
| 4,675,806 | 6/1987 | Uchida .................................... | 712/701 |
| 4,683,547 | 7/1987 | DeGroot ................................. | 708/507 |
| 4,707,800 | 11/1987 | Montrone et al. ...................... | 708/714 |
| 4,766,564 | 8/1988 | DeGroot ................................. | 708/507 |
| 4,771,379 | 9/1988 | Ando et al. .............................. | 712/42 |
| 4,891,753 | 1/1990 | Budde et al. ............................ | 712/217 |
| 4,942,525 | 7/1990 | Shintani et al. ........................ | 712/217 |
| 4,969,117 | 11/1990 | Miranker ................................ | 714/51 |
| 4,989,168 | 1/1991 | Kuroda et al. .......................... | 708/210 |
| 5,043,868 | 8/1991 | Kitamura et al. ....................... | 712/218 |
| 5,095,457 | 3/1992 | Jeong ....................................... | 70/626 |
| 5,125,083 | 6/1992 | Fite et al. ................................. | 712/207 |
| 5,150,469 | 9/1992 | Jouppi ..................................... | 712/244 |
| 5,187,679 | 2/1993 | Vassiliadis et al. ..................... | 708/706 |
| 5,203,002 | 4/1993 | Wetzel ..................................... | 712/21 |
| 5,333,281 | 7/1994 | Nishikawa et al. ..................... | 712/218 |
| 5,471,598 | 11/1995 | Quattromani et al. ................. | 712/218 |
| 5,488,729 | 1/1996 | Vegesna et al. ........................ | 712/209 |
| 5,553,256 | 9/1996 | Fetterman et al. ..................... | 712/217 |
| 5,555,432 | 9/1996 | Hinton et al. ........................... | 712/217 |
| 5,557,763 | 9/1996 | Senter et al. ............................ | 712/23 |
| 5,560,032 | 9/1996 | Nguyen et al. ......................... | 712/217 |
| 5,590,352 | 12/1996 | Zuraski, Jr. et al. ..................... | 712/23 |
| 5,603,047 | 2/1997 | Caulk, Jr. ................................. | 712/23 |
| 5,625,789 | 4/1997 | Hesson et al. .......................... | 712/217 |
| 5,636,353 | 6/1997 | Ikenaga et al. ......................... | 712/218 |

OTHER PUBLICATIONS

Abnous, Arthur, Pipelining and Bypassing in VLIW Processor, IEEE Transactions on Parallel and Distributed Systems, pp. 658–664, Jun. 1994.

(List continued on next page.)

*Primary Examiner*—Zarni Maung
*Assistant Examiner*—Patrice Winder
*Attorney, Agent, or Firm*—Blakely, Sokoloff, Taylor & Zafman LLP

[57] ABSTRACT

A method of processing instructions having register dependencies in a pipelined superscalar processor comprises the steps of fetching operands specified by a first instruction during a first pipestage, then computing address of a source operand for a second instruction so that the subsequent instruction can be processed without incurring data errors. A status bit of a destination register of the first instruction is checked during the decoding stages of the second instruction to determine whether the register is busy or free for use in performing the operation specified. In the case where the register is busy, processing of the subsequent instruction is temporarily frozen. In another situation, a result obtained by a first instruction is provided as a source operand for the second instruction so that the second instruction can be executed without delay.

20 Claims, 7 Drawing Sheets

OTHER PUBLICATIONS

"Philips Hopes to Displace DSPs with VLIW", B, Case, 1994.

"TMS320C2X User's Guide", pp. 3–2 –3–34; 4–1 –4–151, Texas Instruments, 1993.

"New PA–RISC Processor Decodes MPEG Video", pp. 16–17, L. Gwennap.

"Ultra SPARC Multimedia Capabilities On Chip Support for Real–Time Video" "SPARC Technology Business", Sun Microsystems, 1994.

"A Single Chip Digital Processor for Voiceband", Y. Kawakami, 1980.

"Graphics Processing with the 88110 Second Generation RISC", pp. 169–174, J. Shipnes, 1992.

"MC88110 Second Generation RISC . . . ", Motorola Inc. 1991.

"Errata to MC88110 ... ", pp. 1–11, Motorola Inc. 1992.

"MC88110 Programmer's Reference Guide", pp. 1–5, Motorola Inc. 1992.

"i860 Microporcessor Family Programmer's Ref. Manual", Ch. 1,3,8,12, Intel Corp. 1992.

"Accelerating Multimedia with Enhanced Microprocessors", Lee, 1995, IEEE.

"Pentium Processosr User's Manual, vol. 3: Arch. & Prog . . . ", Ch 1,3,4,6,8,18, Intel 1993.

"i860 Microprocessor Architecture", Ch. 6,7,8,10,11, Margulis, 1990.

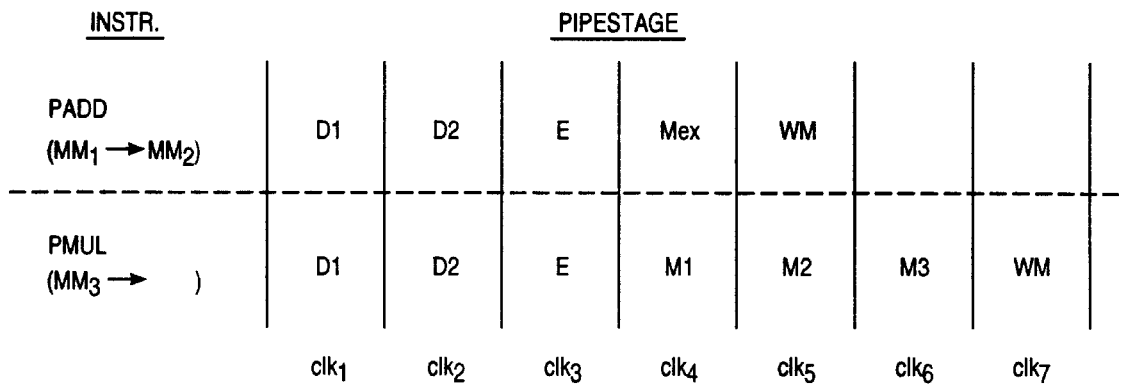
FIG_1
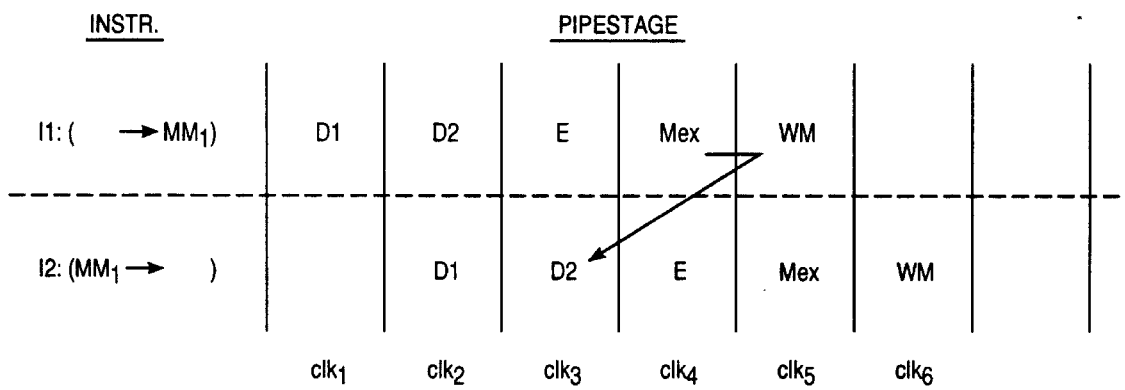
FIG_2
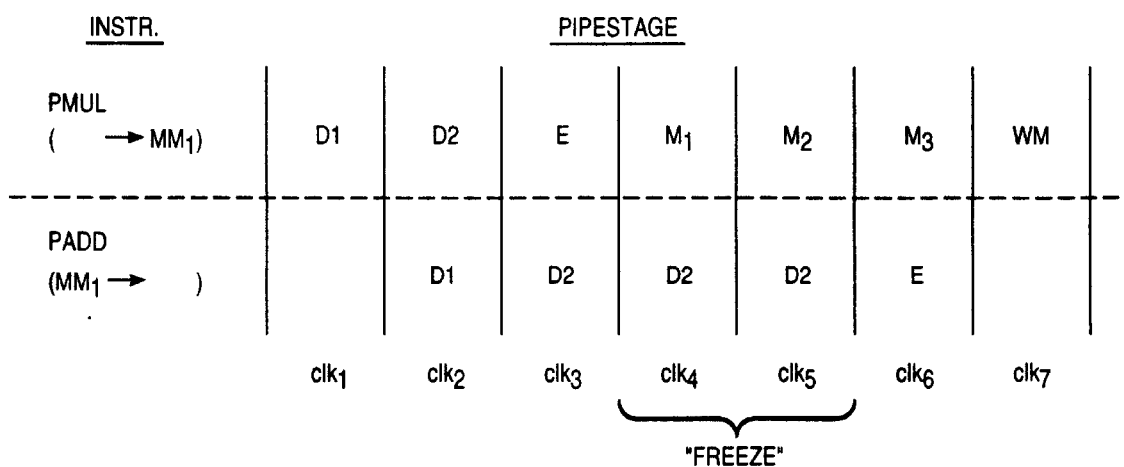
FIG_3

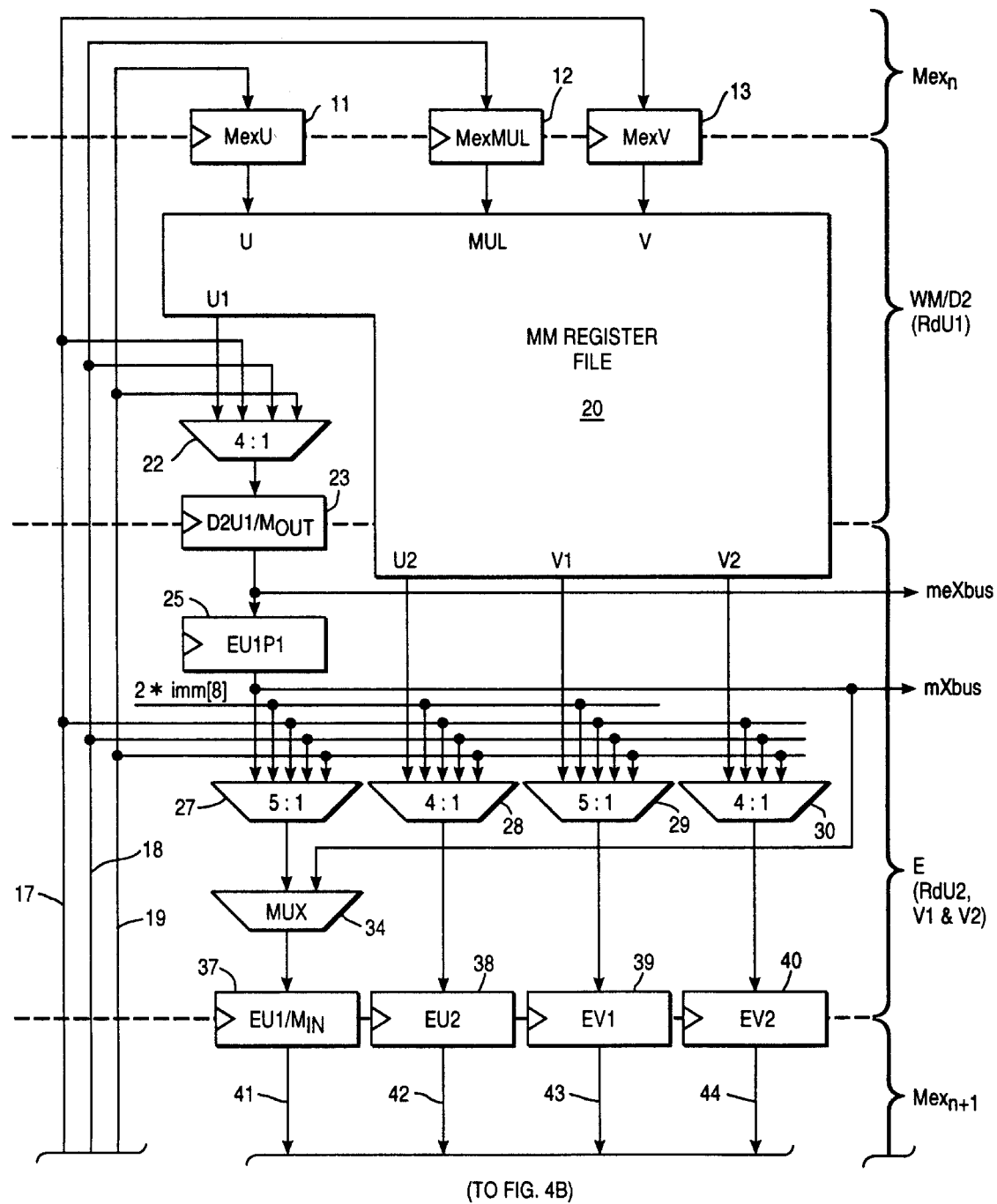
FIG_4A

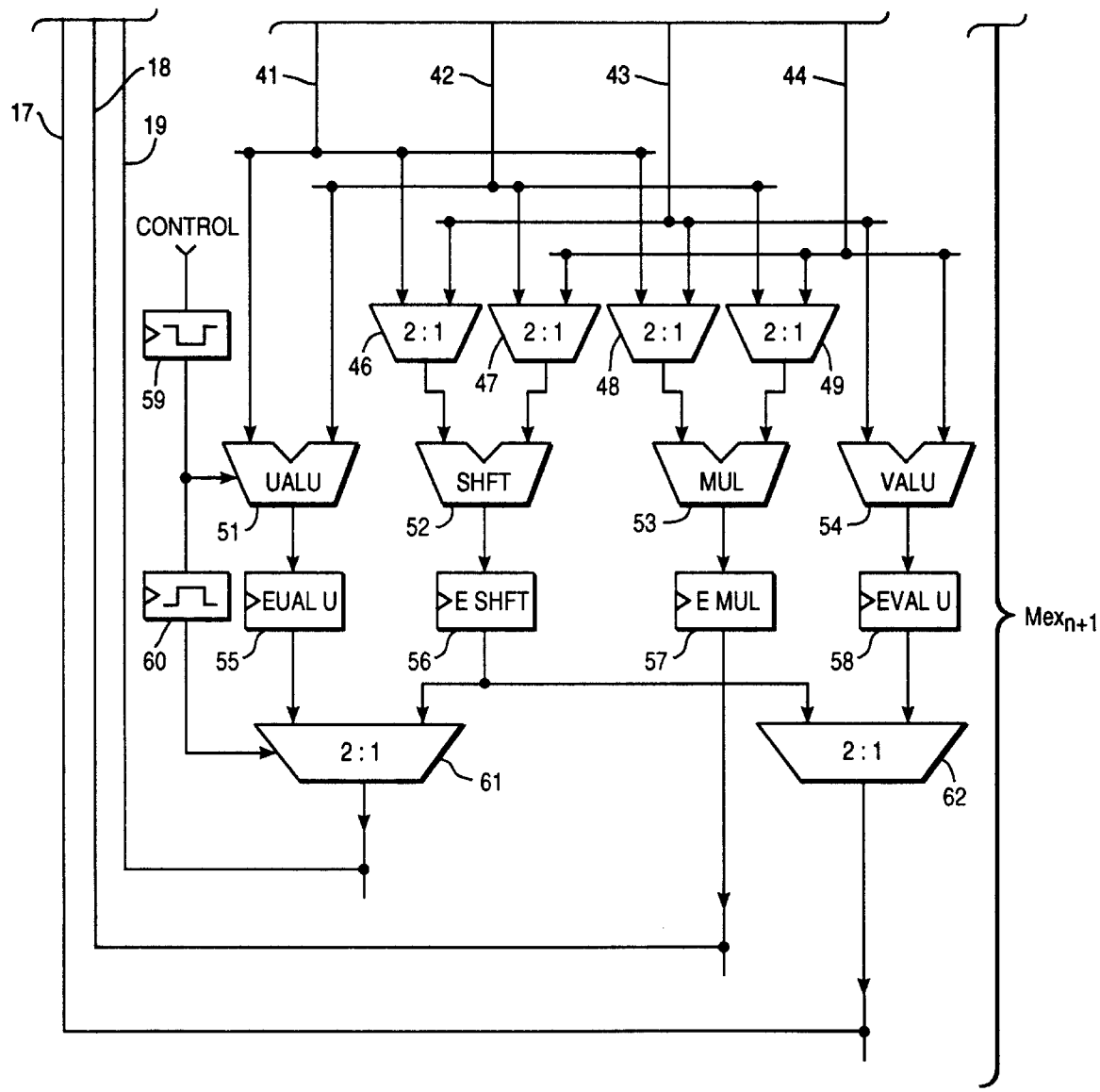
FIG_4B

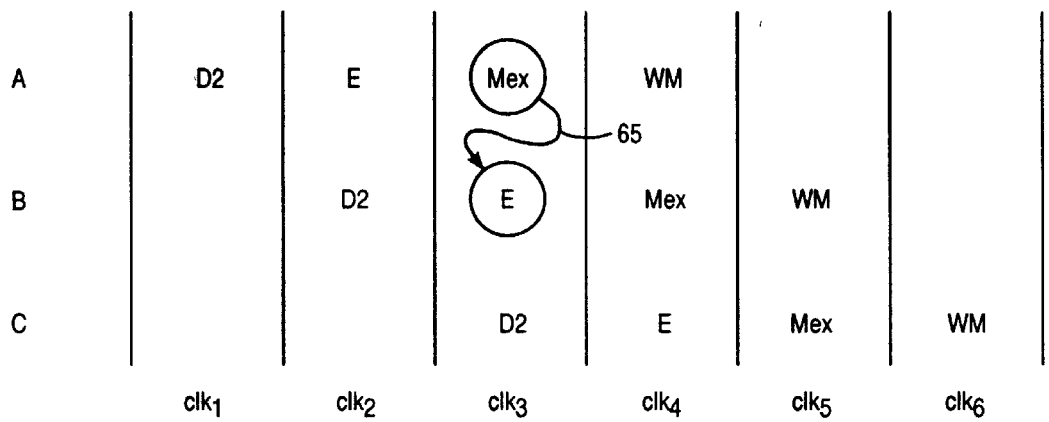
FIG_5
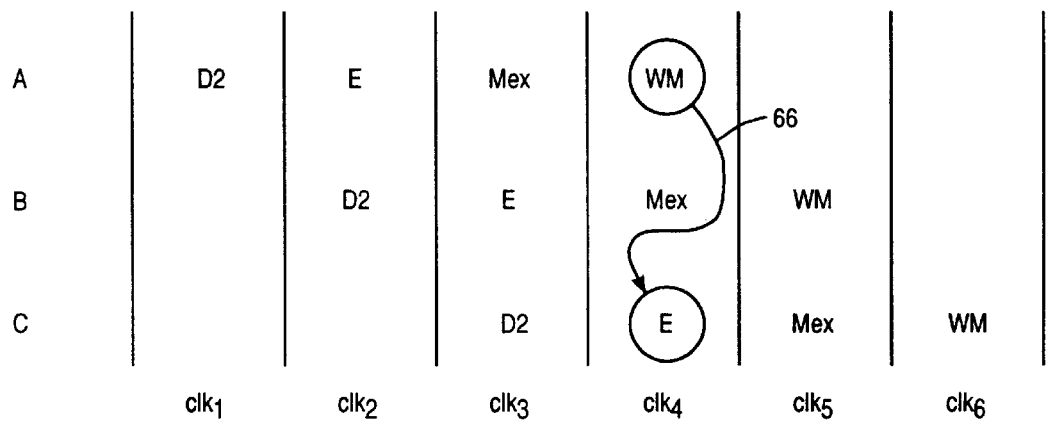
FIG_6
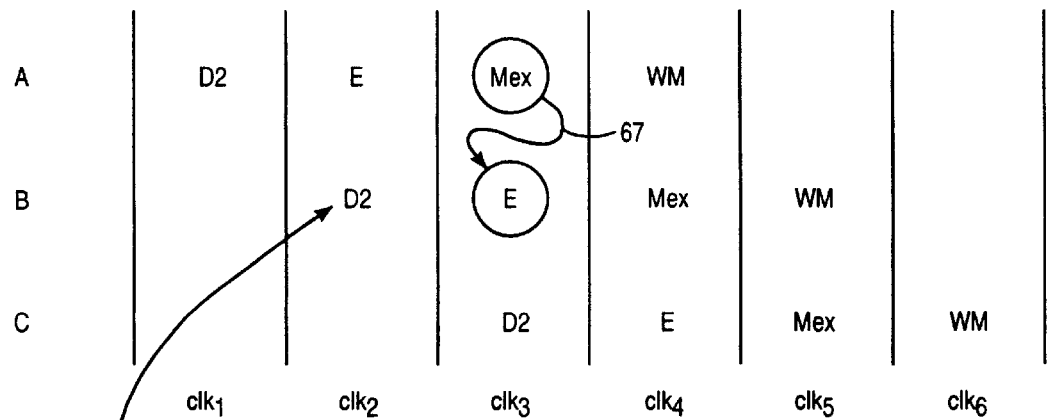
FIG_7

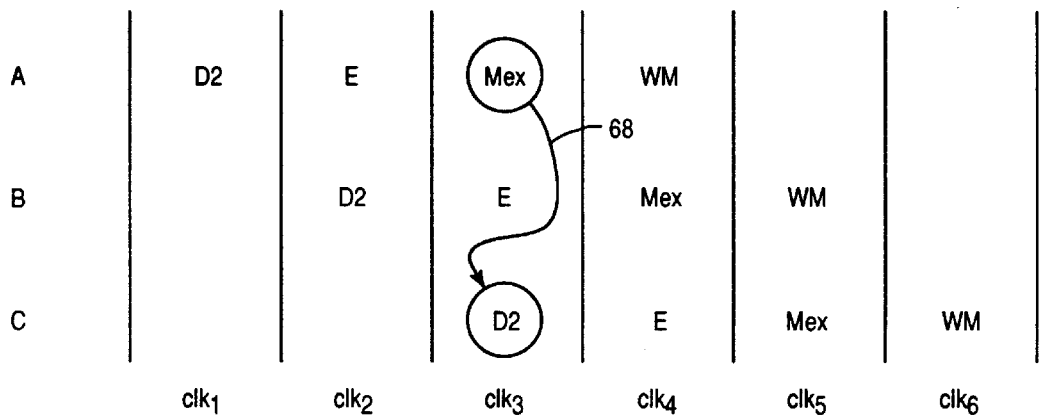
FIG_8
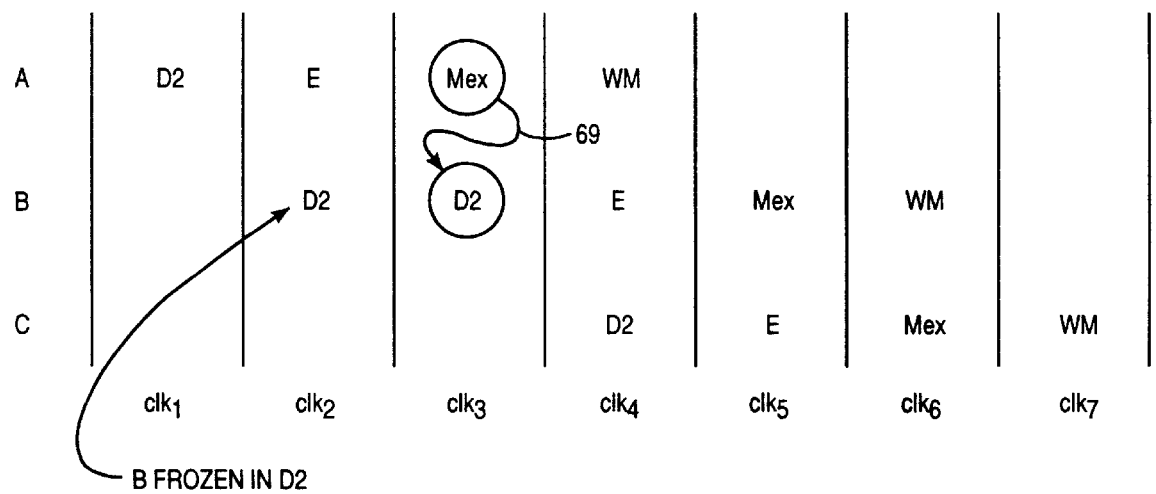
FIG_9 ns having register dependencies (first line is title)

PARALLEL PROCESSING OF PIPELINED INSTRUCTIONS HAVING REGISTER DEPENDENCIES

FIELD OF THE INVENTION

This invention relates generally to the field of concurrent processing of instructions in a computer system. More particularly, the invention relates to superscalar processors capable of executing two or more instructions in parallel.

BACKGROUND OF THE INVENTION

Superscalar data processing machines represent the state-of-the-art in the field of computing systems. These machines are able to execute two or more instruction in parallel under certain conditions. A good example the Intel® Pentium™ processor which is designed to execute pairs instructions if the instructions are of a certain type and if there are no register dependencies. This latter requirement means that data produced by the operation of one instruction cannot be specified as an input operand for the second instruction. In other words, if one instruction utilizes the output of another instruction, the two instructions must execute serially in the proper order.

As one might expect, there has been a great deal of effort in the data processing art focused upon solving the problem of how to best determine the existence of data conflicts in a sequence of pipelined instructions. By way of example, U.S. Pat. No. 4,969,117 discloses a sequential processor which includes circuitry for determining a correct ordering sequence for instructions.

The problem of resolving data dependencies in a superscalar processor has recently become more cumbersome with the advent of speculative execution architectures. These machines are not only are capable of executing instructions in parallel, but also have the ability to execute instructions out-of-order; that is, in an order other than the programmed order with which instructions are issued within the machine. Out-of-order data processors generally execute instructions based upon data and resource availability, and then restore the original program order during a retirement process. The retirement process "retires" instructions by writing their results to a set of architectural registers at the appropriate time.

The present invention deals with the interaction between instructions in an advanced pipelined microprocessor. As will be seen, the invention provides a method for maximizing the number of instructions that can be processed simultaneously within a processor's execution unit. By resolving dependencies—and through the use of mechanisms such as bypassing and scoreboarding—the invention offers faster processing speed for all types of machines (e.g., RISC or CISC).

SUMMARY OF THE INVENTION

A pipelined superscalar processor that maximizes the processing efficiency of successive instructions having register dependencies—particularly when the instructions have a different characteristic execution time—is disclosed. In one embodiment, the invention comprises the initial step of fetching operands specified by a multiplication instruction during a first pipestage. An address is also computed in the first pipestage for a source operand specified by a subsequent operation, so that the subsequent instruction can be processed without incurring data errors.

In a particular embodiment, a status bit associated with the destination register of a multiplication instruction is set prior to the time that the operands are actually provided to the multiplier. The multiplication operation, for example, may be performed in consecutive execution pipestages following the first pipestage. The result of the multiplication is a product. During the decoding stages of a subsequent instruction the status bit is checked to determine whether the register is busy or free for use in performing the operation specified by the subsequent instruction.

In the case where the status bit associated with the source operand register is busy, processing of the subsequent instruction is frozen during the consecutive pipestages. Once the multiplier completes its arithmetic operation and the product is available, the status bit is reset. This product is then provided as the source operand specified by the subsequent instruction. This means that the subsequent instruction can advance to the execution pipestage, assured that the correct data is being utilized for the operation specified.

In another embodiment, a result obtained by a first instruction in a second pipestage is provided as part of a bypass operation to a second instruction. The result is provided as a source operand in a second pipestage for the second instruction so that the second instruction can be executed without delay. In the past, an instruction which was dependent upon the results produced by a current instruction would have to wait until the result had been written back to the register file.

BRIEF DESCRIPTION OF THE DRAWINGS

The present invention will be understood for fully from the detailed description which follows and from the accompanying drawings, which however, should not be taken to limit the invention to the specific embodiments shown, but rather are for explanation and understanding only.

FIG. 1 is an example of how two consecutive instructions may be pipelined in the processor of the present invention.

FIG. 2 illustrates a bypassing operation in accordance with one embodiment of the present invention.

FIG. 3 illustrates a freeze operation for an embodiment of the present invention.

FIGS. 4A and 4B are a detailed circuit schematic diagram of the register file and data path used in one implementation of the present invention.

FIG. 5 is another example illustration the operation of the present invention.

FIG. 6 is an example illustrating a register file write-through in accordance with the embodiment of FIGS. 4A and 4B.

FIG. 7 illustrates a bypass operation for a non-store vector in accordance with the embodiment of FIGS. 4A and 4B.

FIG. 8 is an example illustrating another case of a bypass operation for a non-store vector in accordance with the embodiment of FIGS. 4A and 4B.

FIG. 9 illustrates the case of a freeze for a store vector that requires bypassing in accordance with one embodiment of the present invention.

DETAILED DESCRIPTION

Figure 10:
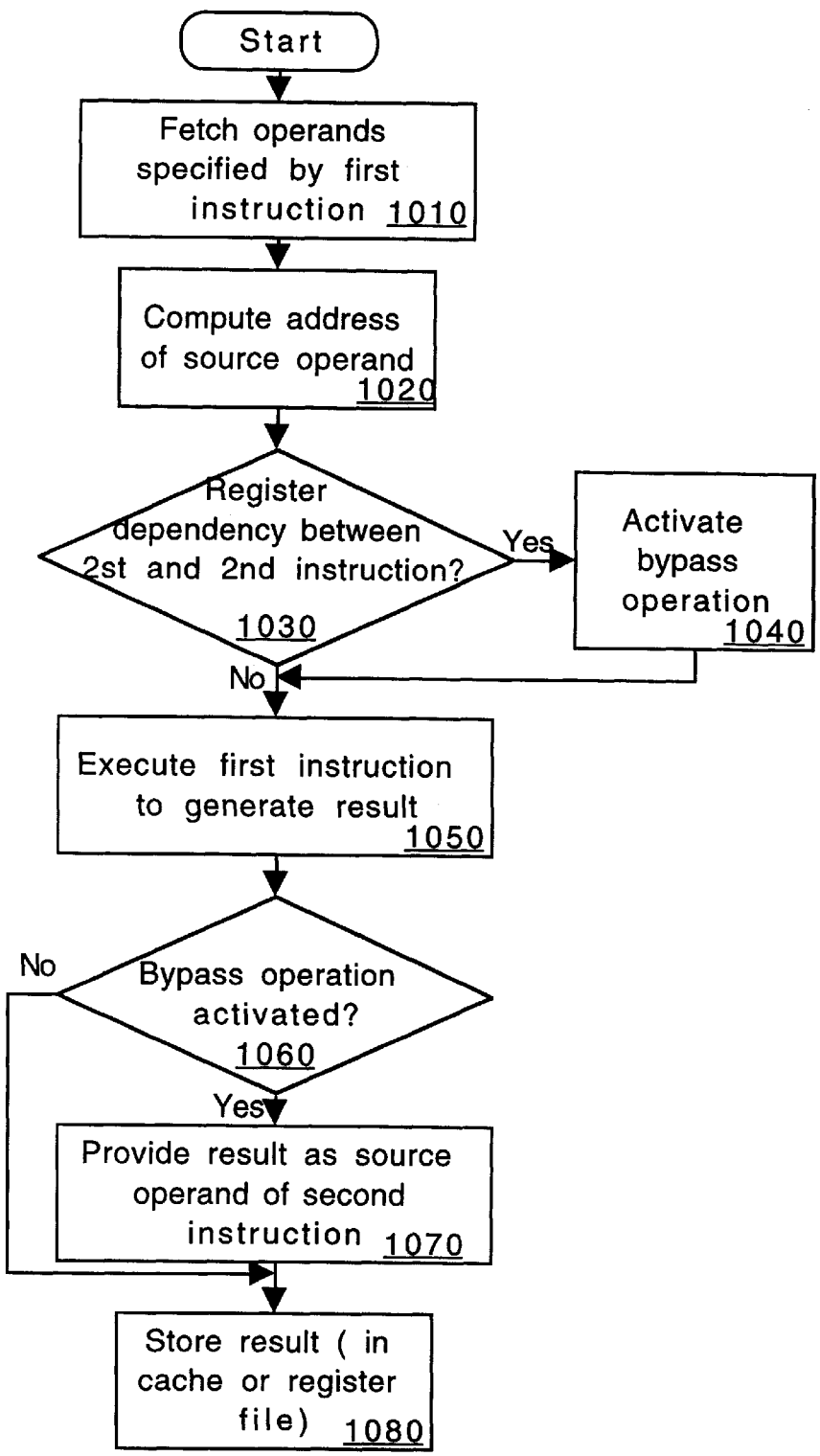
FIG. 10 illustrates a flowchart of one embodiment of the present process.

In a typical data processing system, operands are prefetched from a register file as needed to execute an instruction. Taking the case of a simple execution unit such as an arithmetic logic unit (ALU), it has a known, fixed clock delay (e.g., one clock delay). This means that it takes exactly one clock period from the time that operands are provided to the execution unit until a result is produced. Because of the known clock delay, such a machine can speculate in its decoding unit as to when to issue the next instruction in the program sequence, even in situations where the next instruction requires operands that are dependent upon the operation of the current instruction.

Things become more complicated when you take a machine that is organized to accommodate execution blocks, where each execution block is responsible for executing multiple instructions, and each block has a different characteristic time (in terms of clock delays) that it takes to execute a particular instruction. A more specific problem in a superscalar processor is how many instructions can be processed simultaneously within the execution unit, given variability in the characteristic delay.

Consider the situation in which two consecutive ADD instructions have a register dependency, as shown below.

$INSTR_1$: ADD R3→R1

$INSTR_2$: ADD R1→R2

In this example, the first ADD instruction writes to a register R1, and the second ADD instruction utilizes the contents of register R1 as one of its source operands. Because the second instruction is dependent upon the result of the first instruction, these two instructions could not be issued in parallel in a conventional machine. To put it another way, the decoder would be required to detect the dependency in order for the execution to proceed smoothly. The dependency could then be handled, say, by serializing the instructions.

In the foregoing example, we assumed an instruction latency of one clock cycle. Other scenarios arise when instructions have longer clock latencies. For example, assume that a first instruction writes to register R1, a second instruction moves the contents of register R2 into register R3, followed by a third instruction that utilizes the contents of register R1 as a source operand. This example is shown below.

$INSTR_1$: ADD R2→R1

$INSTR_2$: MOV R2→R3

$INSTR_3$: ADD R1→R3

Assuming that instructions one and two have a single clock latency, then these instructions can be executed in parallel (followed by the third instruction) without incurring data dependency problems. If, however, instruction number one has a latency of, say, three clock periods, then the third instruction (which uses the result produced by instruction number one) must be held up until the result is available. Of course, if there were many instructions in the programming sequence between the data producing instruction and the data consuming instruction, then no problem occurs.

Referring now to FIG. 1, there is shown various pipeline stages (i.e., "pipestage") for a pair of instructions executable on a computer processor in accordance with one embodiment of the present invention. Although the description which follows is specific to a class of instructions designed for processing multimedia data, practitioners in the art will appreciate that the apparatus and method utilized in these embodiments is applicable to a wide variety of specialized, as well as general purpose, computers. In other words, pipelined computer systems of virtually any type will find the present invention advantageous to achieving fast and efficient parallel processing of pipelined instructions.

In the example of FIG. 1, the first instruction, PADD, is an ADD instruction in which source operands stored in registers $MM_1$ and $MM_2$ are added; the result being written to register $MM_2$. The various pipestages for this instruction include D1, which denotes a first decode stage that produces control vectors from the source operands, and a second decode stage, D2, that computes addresses in memory. This is followed by an execute state, E, which accesses a special register file or cache memory storing the source operand data. In normal integer instruction pipelines, the E stage is where the actual computational work is done to produce the desired result. In accordance with the processor of the present invention, however, multimedia instructions are executed in a pipestage called Mex. Therefore, the E stage may simply be thought of as a read stage in which the multimedia register file or data cache is accessed.

Following execution of the instruction, the results are written back to the register file, shown in the example of FIG. 1 by pipestage WM. The writeback stage for instruction PADD is shown occurring in clock period $CLK_5$ for the example of FIG. 1. It is appreciated that the clock latency is one clock for the PADD instruction shown in FIG. 1.

The second instruction of FIG. 1 is a multiply instruction, PMUL. One of the differences between the PADD and the PMUL instruction is that the PMUL instruction requires three pipestages ($M_1$, $M_2$, and $M_3$) to process the data through the multiplier and produce a result. This means that there is a three clock latency associated with the PMUL instruction. In the example of FIG. 1, the result is then written back to the register file in $CLK_7$. Because the PMUL instruction of FIG. 1 does not depend upon the result produced by the preceding PADD instruction, this example presents no difficulties and both instructions can be executed—either sequentially or in parallel.

FIG. 2 illustrates a different situation. In this case, the first instruction I1 writes to register $MM_1$, and the second instruction I2 specifies as a source operand, the result produced and written to $MM_1$. According to the present invention, the decode logic in the processor detects the internal data dependency. Therefore, when instruction I1 moves to pipestage D2, instruction I2 remains in pipestage D1. In other words, a one clock freeze is imposed upon instruction I2. In $CLK_3$ instruction I1 is in the E stage and is prefetching its operands from the register file or data cache. Simultaneously, instruction I2 advances to the D2 stage and computes its addresses from memory.

In the next pipestage, instruction I1 is executed, but because the decode logic detected the internal dependency, the result is bypassed back to the D2 stage of instruction I2. What happens is that in the second phase (i.e., PH2) of the Mex pipestage of instruction I1 the result for register $MM_1$ is provided in the address computation stage of the next instruction as a source operand. In other words, instead of writing the result into the register file and then having instruction I2 wait for an additional clock period (or more), the invention provides the result in the PH2 clock phase of the D2 pipestage for instruction I2 so that the pipeline is not stalled.

The bypass mechanism of the present invention allows data to be bypassed from execution units output in the Mex stage (for multiplication, the data is bypassed from the M3 stage) directly to the E stage or to the D2 stage for the source operand. The processor upon which the present invention may be implemented is compatible with the Intel architecture for microprocessors. Specifically, the processor contemplated for use with the present invention includes a U-pipeline and V-pipeline, so that the machine is capable of executing two instructions in parallel.

In the example of FIG. 2, the two instructions may comprise PADD instructions with a bypass to the D2 stages for the U1 source. Bypass control includes a collision detection mechanisms between the respective write-back stage and the bypass destination point, and qualification for the result for the collision detect generating appropriate multiplexer control. Collision detection involves a comparison between each of a plurality of source quantities and the output destinations. In the particular processor described, five source quantities and three output destinations are compared. The five source quantities are: D2, U1 (for memory operations and moves to integer registers), EU1, EU2, EV1, and EV2, where U and V specify the U-pipeline and V-pipeline, respectively. A total of 15 comparisons are performed to identify all possible combinations between necessary sources and destinations. Note that in the embodiment described, the D2U1 source is the only register read that is actually required in D2 for the example of FIG. 2. The read in D2 is used for memory and integer and register writes. The register read in D2 causes a latency of two clocks between the reading of the data and the use of the data in the Mex stage, which occurs at $CLK_5$.

FIG. 3 illustrates the situation in which a multiplication operation, PMUL, is immediately followed by a PADD instruction that specifies the result produced by the previous PMUL instruction as a source operand for the addition. As can be seen, the PMUL instruction accesses the register file (or data cache) to perform an operand prefetch in the E stage at $CLK_3$. Meanwhile, the PADD instruction has preceded to the D2 address computation stage. At this point, logic associated with the D2 stage of the PADD instruction recognizes that the operands being prefetched for the preceding PMUL instruction are required for the addition can be performed. In a particular implementation of the invention, scoreboarding logic is utilized to "freeze" or halt the PADD instruction until the result is produced by the PMUL instruction. In other words, during $CLK_3$ in the D2 stage, the PADD instruction is frozen for two clocks (i.e., $CLK_4$ and $CLK_5$) in accordance with the three clock latency associated with the preceding multiplication operation.

The particular way that scoreboarding is implemented in the processor of the present invention is by employing a special bit for each register in the register file array. The special bit provides the status of the multimedia register file in terms of the multiply operation. The bit is set to indicate a "busy" state as the operand of a particular register enters the multiplier. Alternatively, the "free" state indicates that the information has exited the multiplier and is now available for use in subsequent instructions.

According to the invention, the status bit information is examined in the D2 pipestage of any multimedia instruction. The status bit is only set for the PMUL instruction that writes to a register. This means that any subsequent instruction that uses that register will be flagged with a busy indication resulting in a freeze. The status bit is reset only after the result becomes available for that particular register. When this happens the frozen instruction waits until the status bit of the corresponding register is reset before preceding in the pipeline.

FIGS. 4A and 4B are a circuit schematic diagram of the multimedia data path according to one embodiment of the present invention. The data path functional unit blocks carry out all the data manipulation needed for execution of multimedia instructions in the implementation described. Practitioners in the art should understand that the actual bypass and source data multiplexers are constructed as contention multiplexers, i.e., as a tristate bus. Thus, care should be taken to ensure that the enables of the multiplexers are mutually exclusive, and that the output of the multiplexer is always driven.

There are two types of bypass multiplexers: one type for E1 and EV1 (having five inputs, including an immediate) and another type for D2U1, EU2, and EV2 (having four inputs to the multiplexer, with no immediate). The first type of multiplexer is shown as multiplexer 27 or 29 in FIG. 4A, whereas the second type consists of multiplexer 28 or 30. The four-input multiplexer type includes one input for the register file 20, one input for the bypass from the multiplier, and one input each from the U-pipe and V-pipe result buses.

The immediate is a straightforward case for controlling the multiplexer because the source that has an immediate is compared to a destination that cannot have an immediate; thus, the collision detect comparison always fails, and the bypass is never enabled. This is guaranteed by design in a current implementation of the invention. Therefore selecting an immediate in this multiplexer only requires that the immediate be decoded from the respective source field. The three bypass inputs are selected if there is a collision reported for that multiplexer and the destination vector that caused the collision is a valid vector.

Prior to entering shifter 52 and multiplier 53, data is multiplexed through respective multiplexers 46 & 47 (for shifter 52) and 48 & 49 (for multiplier 53). The purpose of these multiplexers is select the source operands from either the U-pipeline or the V-pipeline. Logically, all that is required is to determine whether one of the pipelines has its valid bit set, and also that its opcode group indicates a multiply/shift operation. The calculation for this quantity is performed in the E stage and then delayed using an enabled transparent latch (e.g., latches 37–40). The control signal for shifter 52 and the output multiplexer in the U-pipeline are shown being provided in FIG. 4B through latches 59 and 60.

In accordance with the embodiment shown the multimedia data path interfaces with the meX bus in order to read and write data to and from the data cache and integer resources of the processor. In addition, the meX bus is utilized to perform write operations to the cache memory. The multimedia data path shown in FIGS. 4A & 4B comprises several functional unit blocks. For example, a register file functional unit block includes the multimedia register file 20 and the D2 stage bypass multiplexer 22. Together these blocks manipulate three result buses (i.e., U, MUL, and V) and four operand buses (i.e., U1, U2, V1, and V2) simultaneously.

The logic elements below the register file and multiplexer 22—until the time the data enters the arithmetic logic units, shifter and multiplier—comprise the multimedia multiplexer functional unit block. It is this functional unit block that handles the bypassing, operand selection, and bus driving. Accordingly, it comprises multiplexers, latches, and bus drivers. The U-pipeline arithmetic logic unit (UALU) 51, V-pipeline arithmetic logic unit (VALU) 54, shifter (SHFT) 52, and multiplier (MUL) 53 are the functional unit blocks that carry out the actual computations. Each of these functional unit blocks is coupled to two source buses. The result is generated in less than half of a clock cycle.

In the embodiment shown, for all multimedia operations (except for multiply) the data path functions in the D2, E, Mex, and WM pipestages. Notations for these pipestages are shown in FIGS. 4A & 4B along the right hand vertical side of the circuit schematic diagram. Note that the Mex stage is given a subscript notation to indicate the pipeline sequence (i.e., n, n+1).

In the D2 stage, which also corresponds to the WM stage of the preceding operation, the U1 register port is read and result is optionally bypassed from the Mex$_n$ stage. As discussed previously, this feature is enabled through multiplexer 22 in the embodiment of FIGS. 4A and 4B.

In the E stage, the remainder of the read ports are read. This includes ports U2, V1, and V2. The values read from register file 120 are multiplexed with results from bypassing. These multiplexers are shown in FIG. 4A as multiplexers 27–30. The data is latched in these E stage multiplexers. Note that the mX bus and the meX bus are also driven in the E stage, if necessary. Multiplexer 34 is utilized to select between the data on the mX bus and the output of multiplexer 27.

In the Mex pipestage, the multimedia execution units compute the results in the first phase of the clock cycle, i.e., PH1. As shown in FIG. 4B, the input to multiplier 53 and shifter 52 is multiplexed through 2:1 multiplexers 46–49 in order to allow issuing of these instructions in the U and V-pipelines. The latter results are provided to the multiplexers via lines 41–44. The multimedia multiply (PMUL) instruction is executed in the M1, M2, and first phase (PH1) of the M3 pipestages, as previously discussed. The outputs of these functional unit blocks are output onto the three result buses shown in FIGS. 4A & 4B as buses 17, 18, and 19. Multiplexing onto these buses occurs via multiplexer 61 and 62, which received their inputs via latches 55–58.

In the WM pipestage the multimedia register file 20 is updated (see FIG. 4A). Because it might be the case that the reading and writing of the register file overlaps, the register file is provided with a write-through capability in accordance with the present invention.

In one implementation, the multimedia register file contains eight registers ($MM_0$–$MM_7$). Each register is 64-bits wide. The register file can be read via the four read ports as discussed previously. The U1 port is used to read the first source operand (SRC1) for the U-pipeline. The U2 read port is used to read SRC2 for the U-pipeline. Similarly, the V1 and V2 ports correspond to the V pipeline. During a given clock cycle, any multimedia register can be read via any one of the read ports. Furthermore, any register can be read at any number of read ports simultaneously. Note that since in each clock there can be either zero, one, or two vectors running, there may be either 0, 2, or 4 read ports active at any time. The actual reading of the data takes in the second phase (PH2) of the clock cycle.

Referring once again to FIG. 4A, the register file 20 is provided with inputs from the three meX result buses 17–19 which are latched into the three input latches 11–13, respectively. The latched versions provide the inputs to the three register file write ports. The 4:1 multiplexer 22 multiplexes the U1 read port output with the three meX result buses 17–19 for store bypassing. The output of multiplexer 22 constitutes the fourth output bus of the register file functional unit block in the implementation shown.

Register file 20 is read in either the D2 pipestage (for MOV vectors) or in the E pipestage (for the remainder of the multimedia vectors). Register file 20 is written in the WM pipestage. Any access to register file 20, either read or write, is to the entire 64 bits of the registers. In other words, partial reads and writes are not allowed in the embodiment described.

Register file 20 is written to via the three write ports, U, MUL, and V. The U write port is used to write the U-pipeline results to register file 20. Likewise, the V write port is used to write the V-pipeline results. The MUL write port is used for writing the multimedia multiplier results back to the register file. At each clock up to three write ports can write simultaneously to three different registers. A single multimedia register, however, can be written via only one write port at any given clock, with the actual writing taking place in the first phase of the clock cycle.

Register file 20 is implemented as a write-through register file. This takes care of the situation in which a multimedia vector in the WM pipestage writes to a register which is read by a subsequent (e.g., next clock) multimedia vector in either the D2 or the E pipestages. Stated another way, this means that the register file has a read-modify-write capability. Therefore, new values written to a register in a first phase of a clock, can be read in the second phase of the same clock.

The E stage of the data path comprises the multiplexing functional unit block that contains the D2U1/MOUT latch 23, the EU1P1 latch 25, the mX bus and meX bus drivers, the four E stage bypass multiplexers 27–30, the four E stage output latches 37–40 and the four 2:1 Mex operand selection multiplexers 46–49. The multiplexer functional unit block functions in the D2, E, and Mex pipestages. For example, in the second phase of the D2 pipestage, an operand is provided at the output of multiplexer 22 which is then latched into the D2U1/MOUT latch 23, which is a PH2 latch. This latch version is used for E stage data manipulation.

During the E stage, basically the following tasks are executed. First, source operands for the U and V-pipelines are selected. The mX and meX buses are driven for MOV vectors. Also, for all sources (except SRC1 of the U-pipeline) the operand buses from the register file functional unit block (that are valid at the beginning of the second phase of the E stage clock) are multiplexed with the three result buses that are valid at the same time. The result buses are indicated as buses 17, 18, and 19 in FIGS. 4A & 4B. The multiplexer outputs are then latched in the E stage output latches 37–40 for Mex stage usage.

For SRC1, an additional input to the multiplexer is an immediate value (indicated as 2*imm[8]) that is used for shift counts. The actual width of the immediate data is 8 bits and therefore only these bits are 5:1 multiplexed. The rest of the bits in the V1 path are multiplexed by a 4:1 multiplexer.

As discussed earlier, the U1 operand is latched in the D2U1 latch 23, and is valid at the beginning of the E stage clock. The D2U1 latch 23 is latched in the PH1 phase. The EU1P1 latch 25 latches at the following edge of the E stage clock. The operand path from there through the 5:1 multiplier 27 to the E stage output latch (the output line 41 of latch 37) is similar to the V-pipeline SRC1 operand path which has an output latched on line 43 via latch 39.

For MOV (store) vectors, the data is driven onto either the meX bus or the mX bus. In order to preserve the E stage data during an E stage freeze, D2U1 latch 23 is an enabled latch. This means that latch 23 latches the data only if there is no freeze in effect during a current clock. In order to minimize loading impact on the freeze signal, a buffered version of the freeze signal is used as an enable for the D2U1/MOUT latch 23.

For MOV (load) vectors, data is latched from the mX bus into a latch 37 via MUX 34. In other words, 2:1 multiplier 34 selects between the mX bus input and the U1 operand input. From thereon, the data of the EU1/MIN latch 37 propagates the Mex stage the same as the other operands.

The functional unit blocks also work in the Mex pipestage to select the proper operands for shifter 52 and multiplier 53.

The decision is based on whether the shift/multiply vectors have been issued to the U and the V-pipelines. As can be seen in FIG. 4B, two ALUs 51 and 54 are coupled directly to the U and V-pipelines, respectively; therefore, no selection is required. The eight meX operand buses, shown in FIG. 4B as 41–44 and the outputs of multiplexers 46–49, constitute the outputs of the multiplexer functional unit block. These operand buses are coupled directly to the shifter ALU and multiplier functional units.

Referring now to FIG. 5, there are shown three different multimedia vectors running in the pipeline. These vectors are indicated by capital letters A, B, and C. In the example of FIG. 5, there is shown a register conflict in either the U source 2 or the V source 2 pipelines. In other words, a multimedia vector in the E stage needs a register for the operands described above that is a destination register of a previous vector, which is in a further pipestage. In accordance with the invention, these operands are read from the register file in the E pipestage. Thus, FIG. 5 shows vector A in the Mex pipestage at $CLK_3$. In this case, vector B needs a register which is vector A's destination. In this case, the Mex-to-E stage bypass is activated in $CLK_3$ as shown by arrow 65.

A second situation arises when vector C needs data from a register which is the destination register for vector A. FIG. 6 illustrates this case wherein vector A is in the write-back stage during $CLK_4$—the same time that vector C is in the E stage. In this scenario, no bypass is activated since the WM and E stages overlap in the same clock period. In other words, the register is being written and read during the same clock so that what occurs is simply a register file write-through. This is indicated in FIG. 6 by arrow 66.

Another set of cases arise when the register in question is read via the U1 port. Recall that the U1 port is special since it reads the operand in the D2 pipestage and not in the E pipestage. Data for store vectors is read via this port, and the data must be output from the register file in the E clock. For these cases, the processor of the present invention distinguishes between store vectors and non-store vectors.

For non-store vectors, a first case is when a vector B reads a register which is vector A's destination. Here, the data read in the D2 stage of vector B (shown occurring $CLK_2$ in FIG. 7) is stale. This is because it has not yet been updated. On the other hand, since vector A is in the E stage during $CLK_2$, no bypass is available yet. At the end of the D2 stage of vector B (end of $CLK_2$) the value latched into the D2U1 latch is essentially meaningless. Nevertheless, the vector still advances to the next pipestage. In $CLK_3$ vector A advances to the Mex pipestage and generates the result. Vector B advances to the E stage and the Mex-to-E bypass is activated for vector B, as indicated in FIG. 7 by arrow 67.

FIG. 8 illustrates the second case for non-store vectors. In FIG. 8 vector C needs a register which is the destination of vector A. At $CLK_3$ the Mex-to-D2 bypass is activated for vector C, which is in the D2 pipestage. This is shown in FIG. 8 by arrow 68.

FIG. 9 illustrates the set of cases for U1 in which store vectors require bypassing. In FIG. 9 vector B requires vector A's result. In $CLK_2$ vector B is frozen in its D2 stage in order to allow vector A to advance to the Mex pipestage. Only when vector A reaches the Mex stage in $CLK_3$ is the Mex-to-D2 bypass activated for vector B. In accordance with the freezing mechanism described earlier, the D2 freeze is deasserted and vector B is allowed to proceed to the E pipestage. Activation of the bypassing mechanism is indicated by arrow 69 in FIG. 9.

Finally, when vector C is a store vector that requires a register which is written by A, the Mex-to-D2 bypass is activated in the third clock (as previously shown in FIG. 8).

Practitioners in the art will appreciate that register file 20 provides many advantages over structures of the prior art. In a previous design, the register file includes two write ports and two read ports. This allowed both the U and V-pipelines to independently write to the register file. Register file 20, however, employs three write ports and four read ports. Each port comprises data path connections that are coupled to the entire register array. To be specific, the additional write port is added to register file 20 to accommodate multimedia instructions such as PMUL and PADD for the embodiments described above. In other words, because the processor of the invention is operable to execute special multimedia instructions in a pipelined manner, the structure of the register file has been modified. Thus, register file 20 permits three instructions to write to the register file simultaneously. This feature of the invention is advantageous in situations where three instructions are retiring at the same time. For example, a first PMUL instruction may be followed by consecutive PADD instructions and flow through the pipeline such that all three instructions are in the WM pipestage at the same clock. By providing three separate write ports, all three instructions can retire simultaneously.

Furthermore, it is worth noting that this feature of the invention produces out-of-order completion of instructions of a superscalar machine. In other words, in conventional machines where execution unit latency is fixed, the order of completion is always equivalent to the order of program flow. But this is not the case for machines that accommodate mixed execution latencies. That is, because in the processor of the present invention multiplication operations take three clocks to execute whereas ALU shift operations or addition operations take only one clock, there is a need to accommodate out-of-order completion. As described previously, the scoreboarding logic embodied in the present invention ensures that subsequent instructions may not use values written out-of-order before multiplication operations have been completed.

Figure 11:
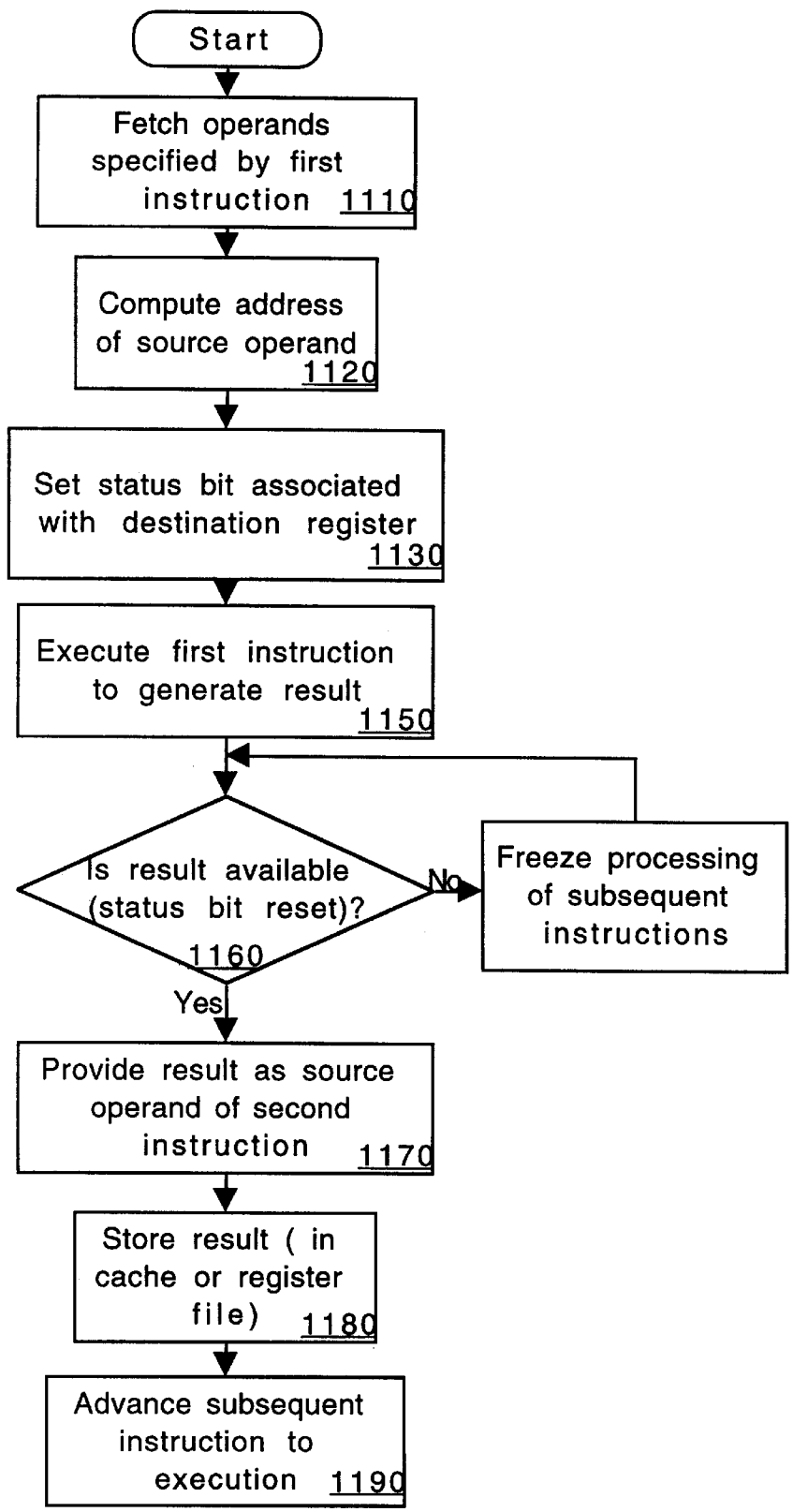
FIG. 11 illustrates a flowchart of another embodiment of the present process.

FIG. 10 illustrates a flowchart of one embodiment of the present process. This process is described above with respect to FIGS. 2, 3 and 5–9. FIG. 11 illustrates a flowchart of another embodiment of the present process. This process is also described above.

I claim:

1. In a superscalar processor, a method of processing successive pipelined instructions comprising:

fetching an operand specified by a first instruction in a first pipestage;

computing in the first pipestage an address of a source operand specified by a subsequent instruction wherein the source operand is a destination register of the first instruction;

determining if the first instruction uses multiple execution stages;

executing the first instruction in consecutive pipestages following the first pipestage to generate a result, and only if the first instruction uses multiple execution stages freezing the processing of subsequent instructions during the multiple execution stages;

generating the result in a first phase of a last execute pipestage;

providing the result as the source operand specified by the subsequent instruction through a bypass operation in a second phase of the last execute pipestage; and advancing the subsequent instruction to an execution pipestage.

2. The method according to claim 1 wherein the consecutive pipestages comprise second, third, and fourth pipestages, and wherein the execute pipestage for the first instruction is the fourth pipestage.

3. The method according to claim 2 wherein the first, second, third, and fourth pipestages are synchronous with a first, second, third, and fourth clock signals, respectively.

4. The method according to claim 3 further comprising the step of:

fetching another source operand specified by the subsequent instruction in the fourth pipestage.

5. The method according to claim 1 wherein the first instruction performs a multiplication and the subsequent instruction performs an addition.

6. The method according to claim 1, wherein the subsequent instruction is being executed in a fifth pipestage, while the result is written into a register file.

7. The method according to claim 1, further comprising the step of freezing subsequent instructions while the first instruction is executed in the consecutive pipestages, and wherein the step of freezing comprises the step of:

producing control vectors from source operands for the subsequent instructions; and freezing the step of computing addresses in memory, and further steps of executing the subsequent instruction.

8. The method according to claim 7, wherein a second decode stage comprises the step of computing addresses in memory.

9. The method of claim 1, wherein said first instruction and said subsequent instruction are executed during a Mex, multimedia execution, stage.

10. The method according to claims 1, 2, 3, 4 or 5 further comprising the step of:

writing the product in the register file in a fifth pipestage.

11. In a superscalar processor, a method of processing successive pipelined instructions comprising:

fetching an operand specified by a first instruction in a first pipestage;

computing in the first pipestage an address of a source operand specified by a subsequent instruction wherein the source operand is a destination register of the first instruction;

only if the first instruction is a multiplication instruction, then setting a status bit associated with the destination register prior to executing of the first instruction;

executing the first instruction in consecutive pipestages following the first pipestage to generate a result;

only if the first instruction is a multiplication instruction performing the steps of:

freezing processing of subsequent instructions during the consecutive pipestages in response to the status bit; and resetting the status bit when the result is available through a bypass operation;

providing the result as the source operand specified by the subsequent instruction through a bypass operation; and advancing the subsequent instruction to execution pipestage.

12. The method according to claim 11 wherein the consecutive pipestages comprise second, third, and fourth pipestages if the instruction is a multiplication instruction.

13. The method according to claim 12 wherein the first, second, third, and fourth pipestages are synchronous with first, second, third, and fourth clock signals, respectively.

14. The method according to claim 11, wherein the consecutive pipe stages are a second pipestage if the instruction is an addition.

15. The method according to claim 14, wherein the first and second pipestages are synchronous with first and second clock signals.

16. The method according to claim 11, wherein the first instruction is an addition instruction.

17. The method according to claim 11, wherein the first instruction is a multiplication instruction.

18. The method according to claim 11, wherein the step of freezing comprises the step of:

producing control vectors from source operands for the subsequent instructions; and freezing the step of computing addresses in memory, and further steps of executing the subsequent instruction.

19. The method according to claim 18, wherein a second decode stage comprises the step of computing addresses in memory.

20. A method of processing successive pipelined instructions comprising the steps of:

identifying a first instruction as an addition instruction or a multiplication instruction;

fetching an operand specified by the first instruction in a first pipestage;

computing in the first pipestage an address of a source operand specified by a subsequent instruction wherein the source operand is a destination register of the first instruction;

executing the first instruction in consecutive pipestages following the first pipestage to generate a result;

if the first instruction is a multiplication instruction setting a status bit associated with the destination register prior to executing of the first instruction;

freezing processing of the subsequent during the consecutive pipestages in response to the status bit;

producing a product in a first phase of an execute pipestage;

resetting the status bit when the result is available through a bypass operation during a second phase of the execute pipestage;

providing the result as the source operand specified by the subsequent instruction during the second phase of the execute pipestage; and if the instruction is an addition instruction, generating a sum during the first phase of the execute pipestage and providing the result through a bypass operation during the second phase of the execute pipestage; and advancing the subsequent instruction to execution pipestage.

* * * * *